Oct. 14, 1924.
J. BAMBERGER
1,511,751
SIGNAL DEVICE FOR AUTOMOBILES
Filed Jan. 12, 1923
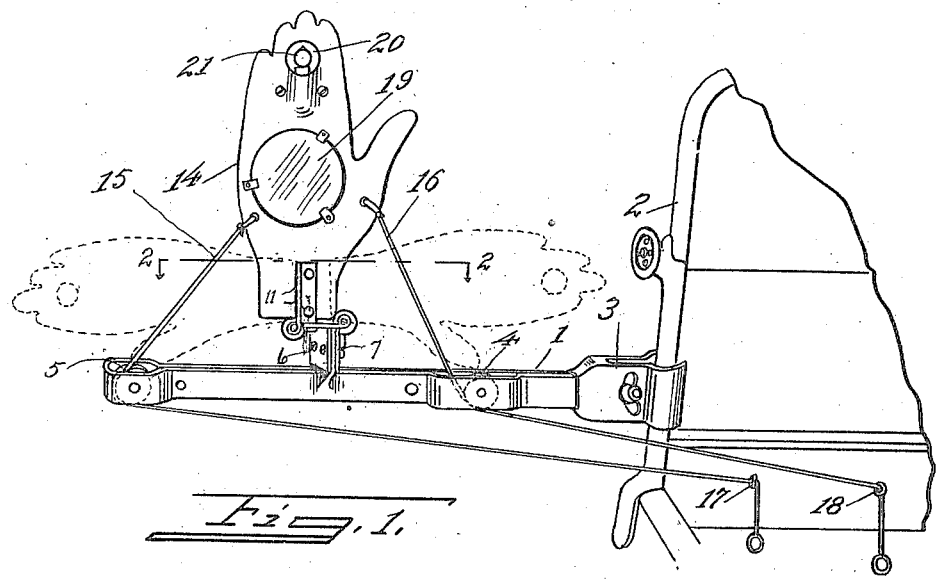
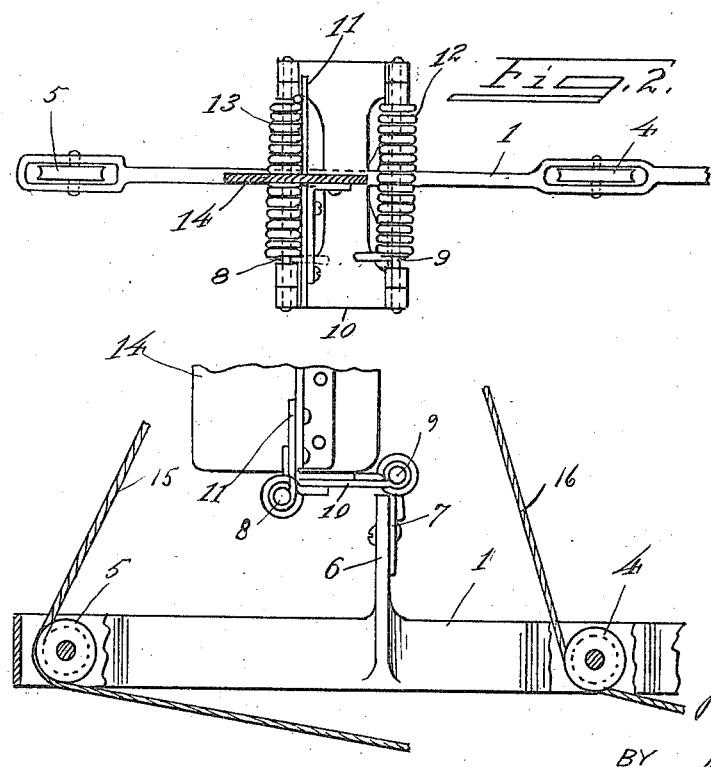
INVENTOR:
Joseph Bamberger,
BY Arthur H. Ewald,
ATTORNEY.

Patented Oct. 14, 1924.

1,511,751

UNITED STATES PATENT OFFICE.

JOSEPH BAMBERGER, OF CINCINNATI, OHIO.

SIGNAL DEVICE FOR AUTOMOBILES.

Application filed January 12, 1923. Serial No. 612,277.

*To all whom it may concern:*

Be it known that I, JOSEPH BAMBERGER, a citizen of the United States, and resident of Cincinnati, in the county of Hamilton and State of Ohio, have invented certain new and useful Improvements in Signal Devices for Automobiles, of which the following is a full, clear, and exact description, reference being had to the accompanying drawings, forming a part of this specification.

My invention relates to signal devices for automobiles and has particular reference to the provision of a device whereby the driver of an automobile may indicate to other persons his intention as to direction or other act in the operation of his vehicle.

The principal object of this invention is to provide a simple and effective device whereby the driver of a motor vehicle may indicate to other persons, either in front or to the rear of said vehicle, his intention to make a turn and the direction thereof.

In the drawings:—

Figure 1 is a perspective of a portion of a motor vehicle equipped with my new device;

Figure 2 is a section of a portion of the device on line 2—2 of Figure 1, the operating cords being removed;

Figure 3 is an elevation of a portion of the device, parts being broken away.

My new device comprises an arm 1 arranged to be secured to the side member 2 of the wind shield of an automobile by means of a clamp member 3, the clamp 3 being of a construction adapted to the particular vehicle upon which the same is to be used. Mounted in slots in the arm 1 are pulley wheels 4 and 5.

The arm 1 is provided with a standard 6 upon which one leaf 7 of a two-way spring hinge is secured by means of rivets or bolts or in any other suitable manner. The hinge is of ordinary two-way spring hinge construction, being provided with pintles 8 and 9, on which three leaves 7, 10 and 11 are pivotally mounted. Coil springs 12 and 13 maintain the leaves 7 and 11 normally in parallel relation. Secured to the leaf 11 in any suitable manner is a direction indicating member 14, preferably, as illustrated in the drawings, in the shape of a hand, the same being so disposed as normally to point vertically upward.

Secured to opposite sides of the member 14 are cords 15 and 16. The cord 15 passes around the pulley 5 and thence thru an eye 17 on the instrument board of the vehicle or other suitable location to a point convenient to the operator. The cord 16 passes around the pulley 4 and thru an eye 18 to a point suitable for convenient operation.

The hand 14 may if desired be provided on its rear side with a mirror 19, and said hand may also be provided with a perforation 20 within which an electric light bulb 21 is mounted, the light being thus visible from the front or rear.

The operation of the device will be apparent from the foregoing description thereof. When a vehicle is equipped with said device the operator by pulling the cord 15, for instance, will pull the hand downwardly, or to the left, to the position indicated in broken lines, thus indicating to other persons that he intends to turn his vehicle in that direction. When the cord is released the hand is automatically returned by means of the spring 13 to vertical position. Operation of the cord 16 is adapted to lower the hand to the right against the tension of the spring 12, which returns it as soon as the cord is released.

It will thus be seen that in the construction described and shown I have provided a simple, inexpensive and efficient device, not automatic in operation, whereby the driver of a vehicle is enabled to indicate his intentions as to direction of travel, and by means of other signals conveniently adapted, as for instance causing the hand to move upwardly and downwardly in rapid succession in either direction, to indicate other acts to be performed during the operation of the vehicle.

Having thus fully described my invention, what I claim as new and desire to secure by Letters Patent is:—

A device of the character described comprising an arm, means for securing said arm to a motor vehicle so that the same will extend laterally therefrom, a two-way spring hinge mounted on said arm intermediate its ends and displaced laterally from said vehicle, a direction indicationg member secured to one leaf of said hinge so as to point normally vertically upward, said member comprising a representation of a hand, and being of a length less than the distance of displacement of said hinge from the side of said vehicle, pulley wheels mounted in said arm on opposite sides of said hinge, and cords attached to opposite sides of said indicating member and arranged to operate respectively around said pulleys whereby said member may be moved either to the right or left to a position substantially parallel with said arm.

JOSEPH BAMBERGER.